3,360,504
HYDROXYALKYL - N - VINYLOXYALKYLCAR-
BAMATES AND HYDROXYALKYL N-VINYL-
ETHIOALKYLCARBAMATES AND POLYMERS
THEREOF
Everett J. Kelley, Moorestown, N.J., assignor to Rohm
& Haas Company, Philadelphia, Pa., a corporation of
Delaware
No Drawing. Filed Nov. 12, 1964, Ser. No. 410,717
10 Claims. (Cl. 260—79.7)

This invention relates to hydroxyalkyl carbamates having vinyloxyalkyl or vinylthioalkyl groups substituted on the nitrogen atom, the addition polymers thereof, and methods of making the monomers and polymers.

The analogous alkyl carbamates are disclosed and claimed in Aycock and Melamed, U.S. Patent 2,806,840, Sept. 17, 1957. The monomeric hydroxyalkyl carbamates of the present invention, like those of the patent, are useful chemical intermediates and are readily polymerized by free radical catalysts. However, the monomers and polymers of the present invention are quite distinct from those of the patent by virtue of the hydroxyl group. This increases the versatility of reaction with modifying reagents, such as aldehydes, acids, isocyanates, and so on. For example, the application of a monomer or polymer of the present invention to a cellulosic fibrous material such as a woven fabric or a "non-woven" web and subsequent treatment with a polyisocyanate serves to combine the carbamate or polycarbamate of the invention chemically with the cellulose by reaction of the polyisocyanate and the hydroxyl groups of each of the first-mentioned materials. The monomers of the present invention form copolymers with other monoethylenically unsaturated compounds which have improved adhesion to various substrates, such as steel, wood, etc.

The monomeric compounds of the present invention have the formula

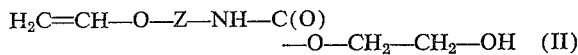

wherein
  A is selected from the group consisting of O and S,
  Z is an alkylene group having 2 to 12 carbon atoms, having at least 2 carbon atoms extending in a chain between the adjoined A radical and N atom,
  R is selected from the group consisting of H and ($C_1$–$C_4$) alkyl groups, and
  Y is a ($C_2$–$C_4$)-alkylene group having at least 2 carbon atoms extending in a chain between the ajoined O atoms.

Preferred compounds of the present invention are those of the formula

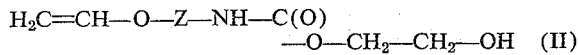

wherein Z may be as defined, but preferably contains 2 to 4 carbon atoms.

The compounds of the present invention may be prepared in various ways. They, for instance, are advantageously made by reacting an alkylene carbonate of the formula

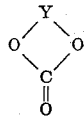   (III)

with an amine of the formula

in which formulas, Y, A, Z, and R are as defined above. The reaction occurs spontaneously at room temperature to a certain extent. Either reactant is added gradually to the other, for example the amine may be added to the carbonate in a suitable reaction vessel and the temperature is controlled during addition as desired in the range of 30 to 95° C. by application of a cooling medium by suitable means. After addition of the amine is completed, the mixture is heated to maintain a desired temperature in the range of 40 to 90° C. over a period of one to eight hours. The reaction mass is then filtered. A polymerization inhibitor is added to the filtrate and then the product may be distilled out of the filtrate under vacuum.

The invention comprises the homopolymers of any one of the vinyl ethers (including thioethers), copolymers of two or more of such vinyl ethers and copolymers of copolymerizable ethylenically unsaturated, and especially monoethylenically unsaturated, monomers comprising from about 0.5% to 99.5% by weight of one or more of the monomeric vinyl ethers of the present invention, obtained by addition polymerization. Copolymers containing from ½ to 20% by weight of the substituted vinyl ether and such neutral, hydrophobic monomers as vinyl ($C_1$–$C_{10}$)-alkyl ethers, such as vinyl methyl ether and vinyl ethyl ether, vinyl ($C_1$–$C_4$)-alkoxy-($C_2$–$C_4$)-alkyl ethers, such as ethoxyethyl vinyl ethers, esters of acrylic acid or methacrylic acid and a saturated aliphatic, alicyclic, or aryl-substituted aliphatic alcohol having from 1 to 18 carbon atoms, vinyl esters such as vinyl acetate, vinyl propionate, or vinyl butyrate, vinyl chloride, vinylidene chloride, acrylonitrile, methacrylonitrile or vinyl aromatic hydrocarbons, such as styrene and the various vinyltoluenes, provide the most important embodiments of the present invention. However, in some specific embodiments the copolymer may contain, besides the vinyl ether and one or more of the neutral monomers mentioned, up to 10% by weight of one or more hydrophilic monomers containing a polar group of neutral or basic character. Examples of these monomers include acrylamide, methacrylamide, N-methylol acrylamide, N-methylol methacrylamide, N-methyl acrylamide, N-methoxymethyl acrylamide, N-butoxymethyl methacrylamide; vinylpyridines such as 2-vinylpyridine, 4-vinylpyridine, 2-methyl-5-vinylpyridine; hydroxyl-containing compounds such as hydroxyethyl vinyl sulfide, hydroxyethyl vinyl ether, hydroxyethoxyethyl vinyl ether, and other hydroxyalkyl vinyl ethers (including the thioethers), hydroxyalkyl acrylates or methacrylates in which the alkyl group contains 2 to 4 carbon atoms such as β-hydroxyethyl acrylate and β-hydroxypropyl methacrylate, N-hydroxyalkyl acrylamides such as N-β-hydroxyethyl methacrylamide and the like. In addition, the copolymer may contain a small amount up to 2% by weight of an α,β-monoethylenically unsaturated carboxylic acid such as acrylic acid, methacrylic acid, itaconic acid, aconitic acid, citraconic acid, α-methacryloxyacetic acid, crotonic acid, maleic acid, and fumaric acid. Preferably the amount of any acid constituent is correlated with the total amount of hydroxyl-containing monomer so that gelation by virtue of crosslinking caused by reaction of the acid and hydroxyl groups does not occur.

The homopolymers and copolymers may be prepared in conventional fashion by solution, emulsion, suspension, or precipitation techniques by the employment of conventional addition polymerization initiators such as those free-radical catalysts in the category of peroxides and hydroperoxides as well as persulfates and the azo catalysts.

To assist those skilled in the art to practice the present invention, the following modes of operation are suggested by way of illustration, the temperatures being centigrade, the parts and percentages being by weight unless otherwise indicated.

(1) *Preparation of monomer 2-hydroxyethyl N-(2-vinyloxyethyl)carbamate*

Ethylene carbonate (88 gms., one mole) is charged to a 500 ml., 3-neck flask equipped with stirrer, thermometer, reflux condenser and dropping funnel. 2-aminoethyl vinyl ether (87 gms., one mole) is added in portions until a definite exotherm is noted (about half of the amine having been added). The remaining amine is then added in one portion and the reaction temperature maintained at 50° C. by external cooling. At the end of the exotherm (15 minutes), the mixture is heated at 50° C. for 5 hours, filtered, and distilled through a short column to give the desired product 2-hydroxyethyl N-(2-vinyloxyethyl)carbamate, B.P. 120° C/0.15 mm. Hg, $n_D^{20} = 1.4759$. A small amount (0.3%) of para-hydroxy diphenylamine is used as polymerization inhibitor during the distillation.

*Analysis.*—Percent unreacted 2-aminoethyl vinyl ether, 0.23 vinyl ether (as milli-equivs./gm. sample), found 5.86, calc. 5.71.

(2) Toluene (233 gms.) is charged to a polymerization flask equipped with a stirrer, a reflux condenser, a thermometer, and dropping funnel. The solvent is stirred and heated to 110° C. A monomer-catalyst solution is made by mixing n-butyl methacrylate (203.7 gms.), methyl methacrylate (135.8 gms.), 2-hydroxyethyl N-(2-vinyloxyethyl)carbamate (10.5 gms.), and azobisisobutyronitrile (1.4 gms.). This solution is added to the hot toluene at an even rate over a period of two hours while the batch temperature is kept at 110–115° C. A catalyst solution (1.92 gms. of azobisisobutyronitrile in 53 gms. of toluene) is added in three equal portions 2, 3, and 4 hours after the addition of the monomer mixture is completed. The mixture is then heated an additional hour, cooled, and diluted with toluene (190 gms.). The final solution of a copolymer of about 58.2% of butyl methacrylate, 38.8% methyl methacrylate and about 3.0% of 2-hydroxyethyl N-(2-vinyloxyethyl)carbamate contains about 40% solids and has a Brookfield viscosity of about 255 cps. at 25° C.

(3) The 40% copolymer solution of (2) above is coated on a vapor-degreased cold-rolled steel panel. After air-drying, the coated panel is heated for ½ hour at about 93° C. Excellent adhesion of the coating, wet and dry, is obtained.

(4) An emulsion copolymer is prepared in the following manner. To a 1-liter, 3-necked, round bottom flask fitted with a reflux condenser, thermometer, Teflon blade agitator and nitrogen inlet is charged water (580 gms.), triethanolamine (10 gms.), t-octylphenoxypoly(40)ethoxyethanol (17.1 gms. of 70% solution), ethyl acrylate (64 gms.), vinyl acetate (132 gms.), and 2-hydroxyethyl N-(2-vinyloxyethyl)carbamate (4 gms.). The system is swept with nitrogen and the temperature adjusted to 15° C. with an ice bath. Polymerization is initiated by the addition of freshly prepared solutions of ammonium persulfate (0.2 gm. in 10 mls. of water), sodium hydrosulfite (0.2 gm. in 10 mls. of water), and a ferrous sulfate-Versene complex (2.0 mls. of 0.1% solution of $FeSO_4 \cdot 7H_2O$ plus 2.0 mls. of 0.1% solution of the sodium salt of ethylenediaminetetraacetic acid) in the given sequence. The polymerization exotherm raises the temperature to 55–60° C. in a few minutes. When the batch temperature drops 10° C. (air cooling only), an ice bath is applied and the dispersion cooled to room temperature. Dispersion of solids following polymerization is approximately 25%. The dispersion is concentrated by evaporation of water at room temperature to a solids content of 46% and the pH adjusted to 9.5 by the addition of concentrated $NH_4OH$.

(5) The latex obtained in (4) above is coated on a vapor-degreased cold-rolled steel panel and is air-dried. The protective film obtained adheres well.

An excellently adhered film results when the emulsion is applied to clean, freshly sanded white pine panels. The treated panels are air-dried for 18 hours before testing.

(6) Protective coatings may be applied to other surfaces such as on panels of glass, cold-rolled steel, wood, masonry, and asbestos cement shingles by the application of the emulsion copolymer of (4) above, if desired after pigmenting in conventional fashion, and optionally curing the coated substrates by heating to 150° C. for ½ hour after air-drying.

Instead of the 2-hydroxyethyl N-(2-vinyloxyethyl)carbamate used in the embodiments mentioned hereinabove for making the copolymers, any one or more monomers of Formula I above may be used.

The polymers, and especially copolymers containing ½ to 20% by weight of a monomer of Formula I can also be employed for laminating two or more sheets or films, such as two panels of metals and especially alkyd-primed metals. The copolymers can be employed for the production of insulating coatings for electric conductors such as copper and aluminum wires, and for this purpose an emulsion copolymer of about 70% acrylonitrile, 2% of 3-hydroxypropyl N-(8-vinyloxyoctyl) carbamate, 4% of acrylamide, and 24% of butyl acrylate may be applied, air dried and then baked at 150° C. for 30 minutes.

The copolymers are also useful for bonding, finishing and coating of papers, leather and textiles, such as shrinkproofing wool and for the bonding of non-woven fabrics. For example, the copolymer of 2% of 2-hydroxyethyl N-(2-vinylthioethyl-carbamate, 3% of N-methylol acrylamide, and 95% of ethyl acrylate prepared by emulsion polymerization in the form of a 45% aqueous dispersion may be applied to a 3-ply carded viscose fiber web having a total weight of 2½ ounces per square yard, air-dried and heated to 150° C. for 5 minutes in order to provide a wash-resistant and dry-cleaning solvent resistant bonded fabric.

Preferred copolymers are those of about 1% to 10% by weight of one of the compounds of Formula I with at least one ester of an acid of the formula $$H_2C=C-(CH_2)_n \cdot H$$
$$|$$
$$COOH$$

in which $n$ is an integer having a value of 1 to 2 with an alcohol having from 1 to 8 carbon atoms such as methanol, ethanol, propanol, butanol, cyclohexanol, and 2-ethylhexanol.

It is to be understood that changes and variations may be made without departing from the spirit and scope of the present invention.

I claim:

1. A compound of the formula $$H_2C=CH-A-Z-N(R)-C(O)-O-Y-OH \quad (I)$$

wherein

A is selected from the group consisting of O and S,

Z is an alkylene group having 2 to 12 carbon atoms, having at least 2 carbon atoms extending in a chain between the adjoined A and N atoms, R is selected from the group consisting of H and ($C_1$–$C_4$) alkyl groups, and Y is a ($C_2$–$C_4$)-alkylene group having at least 2 carbon atoms extending in a chain between the adjoined O atoms.

2. As a composition of matter, a solid addition polymer of a compound of the formula $$H_2C=CH-A-Z-N(R)-C(O)-O-Y-OH \quad (I)$$

wherein

A is selected from the group consisting of O and S,

Z is an alkylene group having 2 to 12 carbon atoms, having at least 2 carbon atoms extending in a chain between the adjoined A and N atoms, R is selected from the group consisting of H and ($C_1$–$C_4$) alkyl groups, and Y is a ($C_2$–$C_4$)-alkylene group having at least 2 carbon atoms extending in a chain between the adjoined O atoms.

3. As a composition of matter, a solid copolymer of about 0.5 to 99.5% by weight of a compound of the formula $$H_2C=CH-A-Z-N(R)-C(O)-O-Y-OH \quad (I)$$

wherein

A is selected from the group consisting of O and S,
Z is an alkylene group having 2 to 12 carbon atoms, having at least 2 carbon atoms extending in a chain between the adjoined A and N atoms,
R is selected from the group consisting of H and ($C_1$–$C_4$) alkyl groups, and
Y is a ($C_2$–$C_4$)-alkylene group having at least 2 carbon atoms extending a chain between the adjoined O atoms, with about 0.5 to 99.5% by weight of at least one neutral copolymerizable, monoethylenically unsaturated monomer.

4. As a composition of matter, a solid copolymer of about 0.5 to 20% by weight of a compound of the formula $$H_2C=CH-A-Z-N(R)-C(O)-O-Y-OH \quad (I)$$

wherein

A is selected from the group consisting of O and S,
Z is an alkylene group having 2 to 12 carbon atoms, having at least 2 carbon atoms extending in a chain between the adjoined A and N atoms,
R is selected from the group consisting of H and ($C_1$–$C_4$) alkyl groups, and
Y is a ($C_2$–$C_4$)-alkylene group having at least 2 carbon atoms extending in a chain between the adjoined O atoms, with 0 to 10% by weight of at least one hydrophilic monomer, containing a polar group of neutral to basic character, 0 to 2% by weight of an α,β-monoethylenically unsaturated carboxylic acid, and the balance to make 100% of at least one neutral, essentially hydrophobic monoethylenically unsaturated monomer.

5. 2-Hydroxyethyl N-(2-vinyloxyethyl)carbamate.

6. As a composition of matter, a solid addition polymer of 2-hydroxyethyl N-(2-vinylthioethyl)carbamate.

7. As a composition of matter, a solid copolymer of about 0.5 to 99.5% by weight of 2-hydroxyethyl N-(2-vinyloxyethyl)carbamate.

8. As a composition of matter, a solid copolymer of about 0.5 to 20% by weight of 2-hydroxyethyl N-(2-vinyloxyethyl)carbamate, with 0 to 10% by weight of at least one hydrophilic monomer containing a polar group of neutral to basic character, 0 to 2% by weight of an α,β-monoethylenically unsaturated carboxylic acid, and the balance to make 100% of at least one neutral, essentially hydrophobic monoethylenically unsaturated monomer.

9. A substrate coated with a solid copolymer of about 0.5 to 99.5% by weight of a compound of the formula $$H_2C=CH-A-Z-N(R)-C(O)-O-Y-OH \quad (I)$$

wherein

A is selected from the group consisting of O and S,
Z is an alkylene group having 2 to 12 carbon atoms, having at least 2 carbon atoms extending in a chain between the adjoined A and N atoms,
R is selected from the group consisting of H and ($C_1$–$C_4$) alkyl groups, and
Y is a ($C_2$–$C_4$)-alkylene group having at least 2 carbon atoms extending in a chain between the adjoined O atoms, with about 0.5 to 99.5% by weight of at least one neutral copolymerizable, monoethylenically unsaturated monomer.

10. A method for producing the compound of Formula I as defined in claim 1 which comprises reacting an alkylene carbonate of the formula:

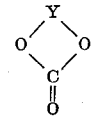

with an amine of the formula:

$$H_2C=CH-A-Z-NHR$$

wherein Y, A, Z and R are as defined in claim 1.

References Cited

UNITED STATES PATENTS 3,165,498   1/1965   Bissinger _____ 260—77.5

JOSEPH L. SCHOFER, *Primary Examiner.*

D. K. DENENBERG, *Assistant Examiner.*